United States Patent [19]

Shiobara et al.

[11] Patent Number: 5,290,882
[45] Date of Patent: Mar. 1, 1994

[54] THERMOSETTING RESIN COMPOSITIONS

[75] Inventors: Toshio Shiobara; Hisashi Shimizu; Manabu Narumi, all of Annaka, Japan

[73] Assignee: Shin-Etsu Chemical Co., Ltd., Tokyo, Japan

[21] Appl. No.: 928,064

[22] Filed: Aug. 11, 1992

[30] Foreign Application Priority Data

Aug. 13, 1991 [JP] Japan ............... 3-228266
Aug. 13, 1991 [JP] Japan ............... 3-228267

[51] Int. Cl.$^5$ ............... C08L 63/04; C08L 63/10
[52] U.S. Cl. ............... 525/422; 525/476; 525/502; 523/429; 523/433; 523/435; 528/97; 528/117; 528/27
[58] Field of Search ............ 528/27, 97, 117; 525/476, 502, 422; 523/429, 433, 435

[56] References Cited

U.S. PATENT DOCUMENTS

| | | | |
|---|---|---|---|
| 4,127,615 | 11/1978 | Zahir et al. | 525/504 |
| 4,551,508 | 11/1985 | Urasaki | 525/507 |
| 4,816,531 | 3/1989 | Young | 525/488 |
| 5,006,614 | 4/1991 | Itoh et al. | 525/476 |
| 5,070,154 | 12/1991 | Shiobara et al. | 525/422 |
| 5,095,074 | 3/1992 | Chu et al. | 525/422 |

FOREIGN PATENT DOCUMENTS

| | | |
|---|---|---|
| 429667 | 6/1991 | European Pat. Off. |
| 52-994 | 1/1977 | Japan. |
| 52-154896 | 6/1977 | Japan. |
| 56-050900 | 12/1981 | Japan. |
| 90/15832 | 12/1990 | World Int. Prop. O. |

Primary Examiner—Ralph H. Dean
Attorney, Agent, or Firm—Birch, Stewart, Kolasch & Birch

[57] ABSTRACT

A thermosetting resin composition contains (A) an imide compound having a maleimide group, (B) an epoxy resin, (C) a phenolic resin, and optionally, (D) an aromatic polymer/organopolysiloxane copolymer. Component (B) and/or (C) includes a compound containing a naphthalene ring having an allyl group and preferably, a compound containing a naphthalene ring and a double bond conjugated with an aromatic ring. The composition is easily workable and cures to products having improved heat resistance, low thermal expansion, and low water absorption.

10 Claims, No Drawings

THERMOSETTING RESIN COMPOSITIONS

This invention relates to thermosetting resin compositions which are easy to process and cure into products having high heat resistance.

BACKGROUND OF THE INVENTION

Thermosetting resin compositions are used as electrically insulating materials, structural materials, adhesives and the like by casting, impregnating, laminating or molding. The recent trend is toward severer requirements on materials used in these applications, and especially the heat resistance of materials is an important requirement.

Polyimide and epoxy resins form typical classes of commonly used thermosetting resin compositions. Polyimide resins have good heat resistance, but require long-term high-temperature heating to process, that is, having a processing disadvantage. Epoxy resins which are modified to improve heat resistance are easier to process, but poor in mechanical and electrical properties at high temperatures and long-term heat degradation resistance, and high-level heat resistance.

There are known some substitutes for the polyimide and epoxy resins, including a thermosetting resin mixture comprising a polyimide and an alkenylphenol or alkenylphenol ether (Japanese Patent Application Kokai=JP-A No. 994/1977) and a thermosetting resin composition comprising a maleimide compound, a polyallylated phenol and an epoxy resin (Japanese Patent Publication 57-28416). The polyallylated phenol used in the latter composition is obtained by Claisen rearrangement of a polyallyl ether or has the structure that generates a phenolic hydroxyl group through Claisen rearrangement upon heat curing. Each substituting allyl group and the hydroxyl or ether group are at ortho positions on a common aromatic ring, and in the case of novolak type resin compositions, these groups tend to remain unreacted even after curing, leaving problems in as-cured properties and heat degradation resistance at high temperatures.

SUMMARY OF THE INVENTION

Therefore, an object of the present invention is to provide a thermosetting resin composition which is easy to process and cures into a product having heat resistance, minimal thermal expansion, and low moisture absorption.

According to the present invention, there is provided a thermosetting resin composition comprising (A) an imide compound having a maleimide group of the general formula [I]:

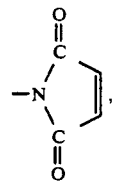

(B) a resin having at least two epoxy groups in a molecule, and (C) a resin having a phenolic hydroxyl group in a molecule. At least one of components (B) and (C) includes a compound containing a naphthalene ring having an allyl group. At least one of components (B) and (C), which may be the same or different from the first one, may include a compound containing a naphthalene ring having a double bond conjugated with an aromatic group.

The thermosetting resin composition may further comprise (D) a copolymer obtained by reacting an aromatic polymer with an organopolysiloxane of the following compositional formula [II]:

wherein $R^1$ is a hydrogen atom, an organic group containing a functional group selected from the group consisting of an amino, epoxy, hydroxyl and carboxyl group, or an alkoxy group, $R^2$ is a substituted or unsubstituted monovalent hydrocarbon group, letters a and b are positive numbers meeting $0.001 \leq 1 \leq 1$, $1 \leq b \leq 3$, and $1 \leq a+b \leq 3$. In the copolymer, the number of silicon atoms in a molecule is an integer of from 2 to 1,000, and the number of $R^1$ groups attached to a silicon atom in a molecule is an integer of at least 1.

The thermosetting resin compositions of the invention are low stressed, highly adhesive, and easy to process and cure into products having improved mechanical strength at high temperature, hot water resistance, heat resistance, and low moisture absorption. The compositions thus fully satisfy the requirements of advanced thermosetting resin compositions and are very useful as electrically insulating materials, structural materials, adhesives, powder coating materials, semiconductor encapsulating materials, and the like.

In general, imide compounds having a maleimide group are very effective for imparting heat resistance. However, thermosetting resin compositions having such imide compounds blended therein are undesirable in long-term heat resistance, adhesion, moisture absorption and workability. The inventors have found that when an imide compound having a maleimide group of formula [I] is blended with a compound containing a naphthalene ring having an allyl group (and a compound containing a naphthalene ring having a double bond conjugated with an aromatic group), a vinyl group in the maleimide group-containing compound reacts with a vinyl group in the compound containing a naphthalene ring having an allyl group (and the compound containing a naphthalene ring having a double bond conjugated with an aromatic group) to form a copolymer, resulting in a thermosetting resin composition having eliminated the problems associated with the imide compound and exhibiting excellent properties as mentioned above.

The thermosetting resin compositions can be reduced in stress by adding thereto a copolymer obtained by reacting an aromatic polymer with an organopolysiloxane of formula [II].

DETAILED DESCRIPTION OF THE INVENTION

The thermosetting resin composition of the present invention is defined as comprising (A) an imide compound, (B) an epoxy resin, and (C) a curing resin having a phenolic hydroxyl group.

Component (A) is an imide compound having a maleimide group of the general formula [I]:

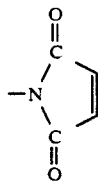

Preferred among the imide compounds having a maleimide group of formula [I] are those having at least one N-substituted maleimide group as a structural unit in molecule. Preferred imide compounds are of the following formula [III].

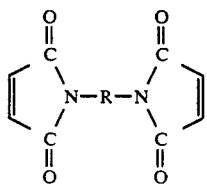

In formula [III], R is a divalent aliphatic hydrocarbon group having 1 to 20 carbon atoms or a divalent aromatic hydrocarbon group having 6 to 20 carbon atoms. Examples of the group R are shown below.

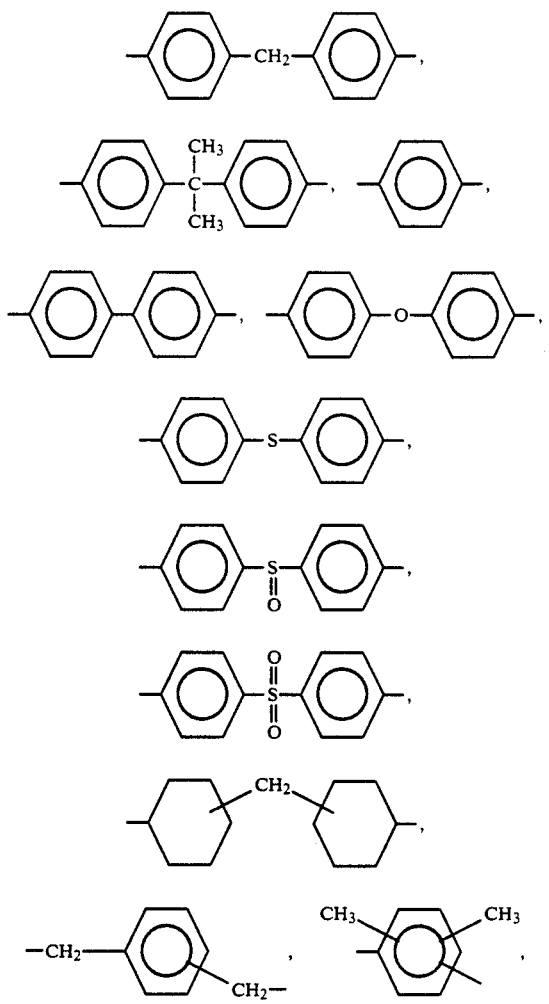

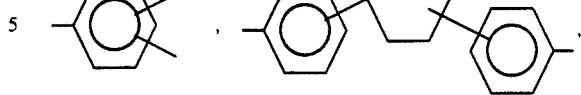

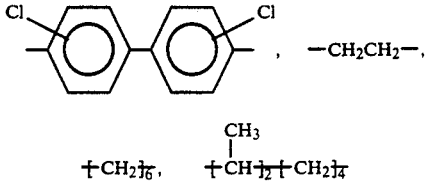

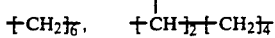

Examples of the compound having an N-substituted maleimide group include

N,N'-bismaleimide compounds (inclusive of isomers) such as N,N'-diphenylmethanebismaleimide, N,N'-phenylenebismaleimide, N,N'-diphenyletherbismaleimide, N,N'-diphenylsulfonebismaleimide, N,N'-dicyclohexylmethanebismaleimide, N,N'-xylenebismaleimide, N,N'-tolylenebismaleimide, N,N'-xylylenebismaleimide, N,N'-diphenylcyclohexanebismaleimide, N,N'-dichlorodiphenylbismaleimide, N,N'-diphenylmethanebismethylmaleimide, N,N'-diphenyletherbismethylmaleimide, N,N'-diphenylsulfonebismethylaleimide, N,N'-ethylenebismaleimide, N,N'-hexamethylenebismaleimide, and N,N'-hexamethylenebismethylmaleimide, prepolymers obtained by addition reaction between these N,N'-bismaleimide compounds and diamines and terminated with an N,N'-bismaleimide skeleton, and maleimide derivatives and methylmaleimide derivatives of aniline-formalin condensates.

Other useful imide compounds are compounds of the following formula and mixtures of a mono-substituted maleimide, tri-substituted maleimide or tetra-substituted maleimide and a substituted bismaleimide.

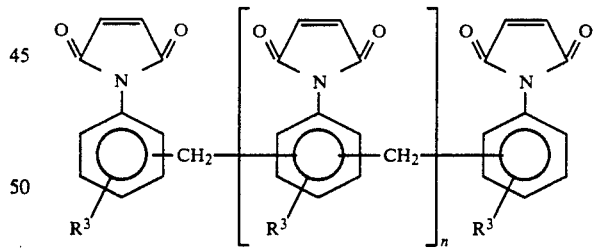

In the formula, $R^3$ is a hydrogen atom, halogen atom or an alkyl group having 1 to 4 carbon atoms, and n is an integer of 1 to 20.

Also useful are the aforementioned maleimide compounds modified with silicones.

In the practice of the invention, these imide compounds may be used alone or in admixture of two or more. Preferred are N-substituted trimaleimides and N-substituted bismaleimides, especially N,N'-diphenylmethanebismaleimides.

Component (B) is an epoxy resin having at least two epoxy groups in a molecule. Examples of the epoxy resin include bisphenol-A type epoxy resins, phenol novolak type epoxy resins, glycidyl ether type epoxy resins such as allyl phenol novolak type epoxy resins, triphenol alkane type epoxy resins and polymers thereof, naphthalene type epoxy resins, biphenyl type epoxy resins, dicyclopentadiene type epoxy resins, phenol aralkyl type epoxy resins, glycidyl ester type epoxy resins, cycloaliphatic epoxy resins, heterocyclic epoxy resins, and halogenated epoxy resins. Also useful are epoxy resins having a substituted or unsubstituted allyl-containing naphthalene ring in a molecule in a part or whole thereof, and epoxy resins containing at least one naphthalene ring having a double bond (e.g., 1-propylene or 1-butylene group) conjugated with an aromatic ring in a molecule. Preferred among others are epoxy resins containing a naphthalene ring having an allyl group and epoxy resins containing a naphthalene ring having a double bond conjugated with an aromatic ring because the resulting thermosetting resin compositions will cure to products having a low coefficient of expansion and low moisture absorption.

Illustrative, non-limiting examples of the epoxy resin having a naphthalene ring are given below.

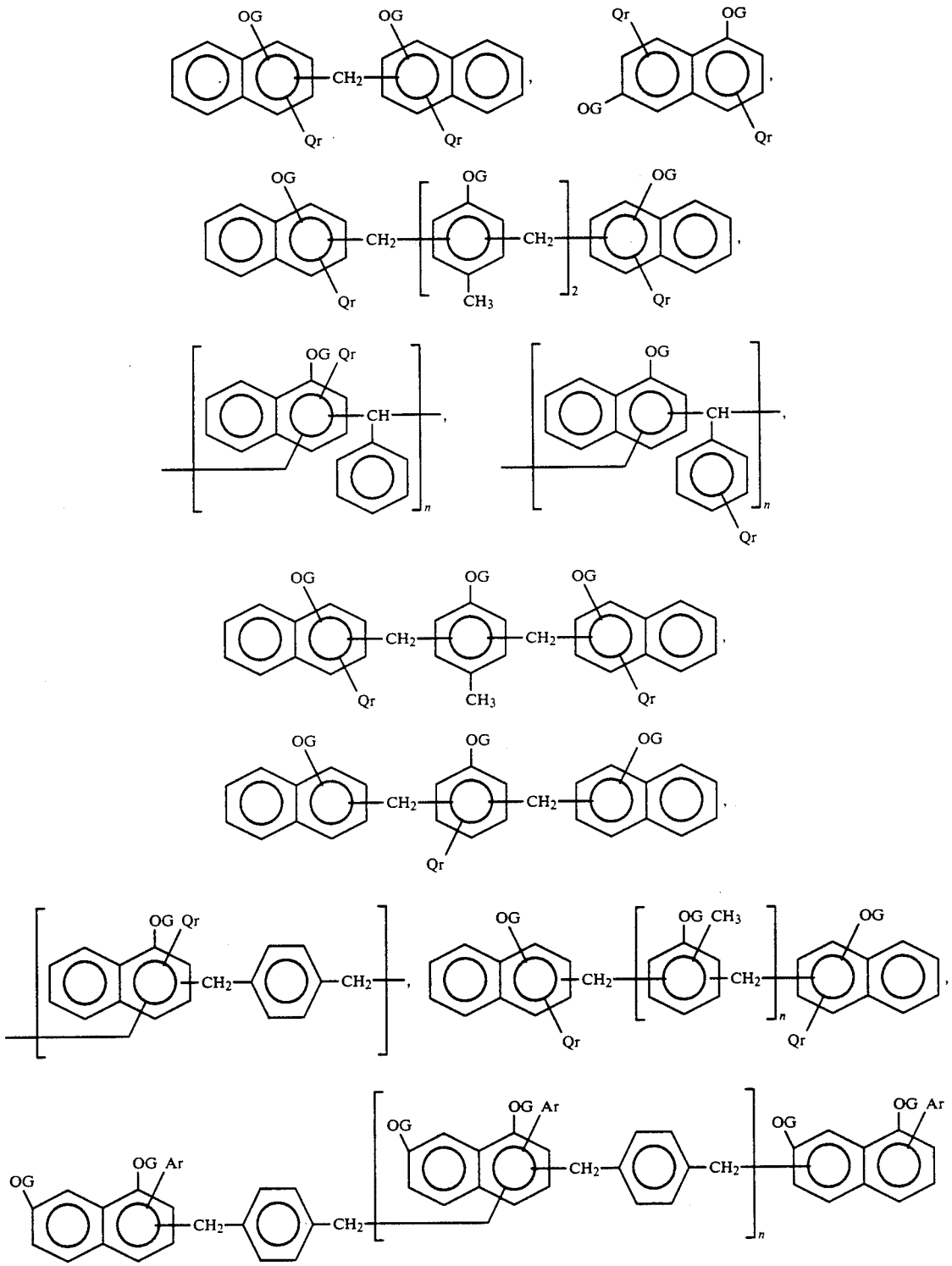

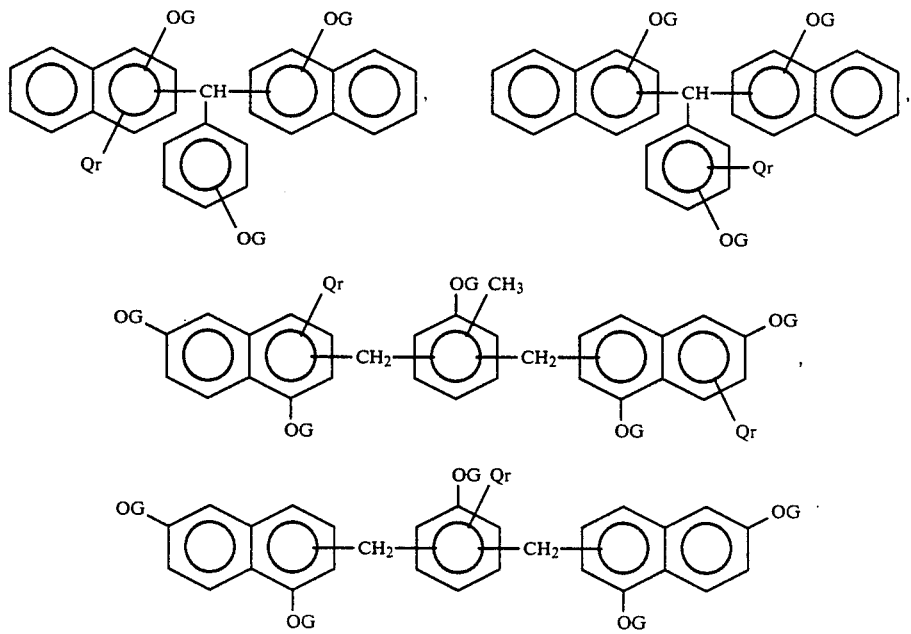

G: —CH₂—CH—CH₂ (epoxide)  Qr: —CH=CH—CH₃ or —CH₂—CH=CH₂  Ar: —CH₂—CH=CH₂  n: an integer of from 2 to 7

The epoxy resins may be used alone or in admixture of two or more.

Component (C) is a resin having a phenolic hydroxyl group in a molecule which serves as a curing agent. Included are phenolic resins such as novolak type phenolic resins, resol type phenolic resins, triphenol alkane type resins, naphthol type resins, and biphenyl type phenolic resins. Also useful are phenolic resins having a substituted or unsubstituted allyl group-containing naphthalene ring in a molecule and phenolic resins containing at least one naphthalene ring having a double bond (e.g., 1-propylene or 1-butylene group) conjugated with an aromatic ring in a molecule. The phenolic resins may be used along or in admixture of two or more.

Preferred among these phenolic resins are phenolic resins containing a naphthalene ring having an allyl group and phenolic resins containing a naphthalene ring having a double bond conjugated with an aromatic ring because the resulting thermosetting resin compositions cure to products having a low coefficient of expansion, a high glass transition temperature (Tg), a low modulus of elasticity at temperatures above Tg, and minimal moisture absorption.

Illustrative, non-limiting examples of the phenolic resin having a naphthalene ring are given below.

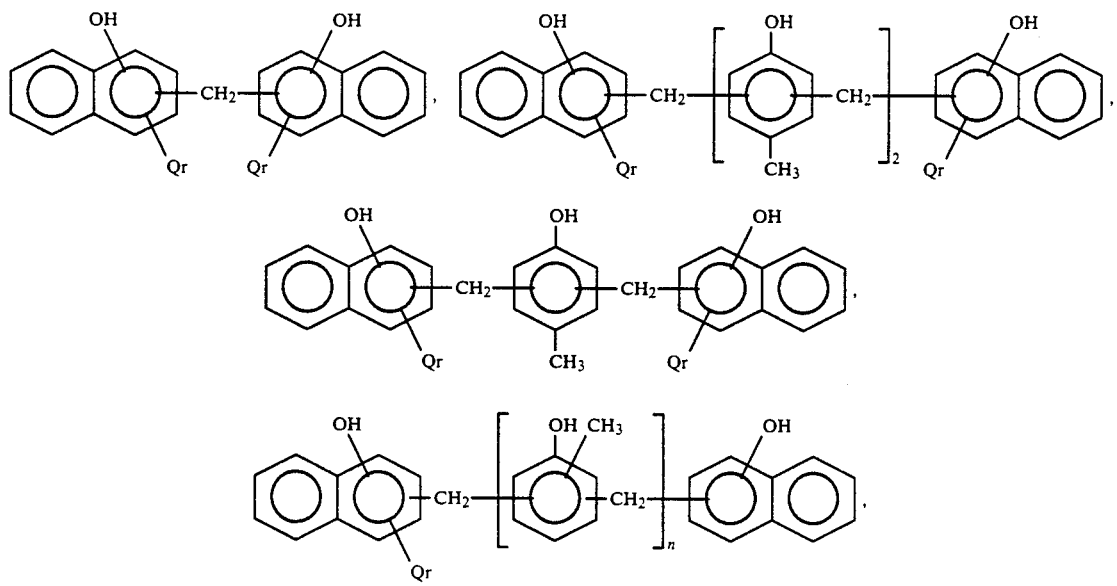

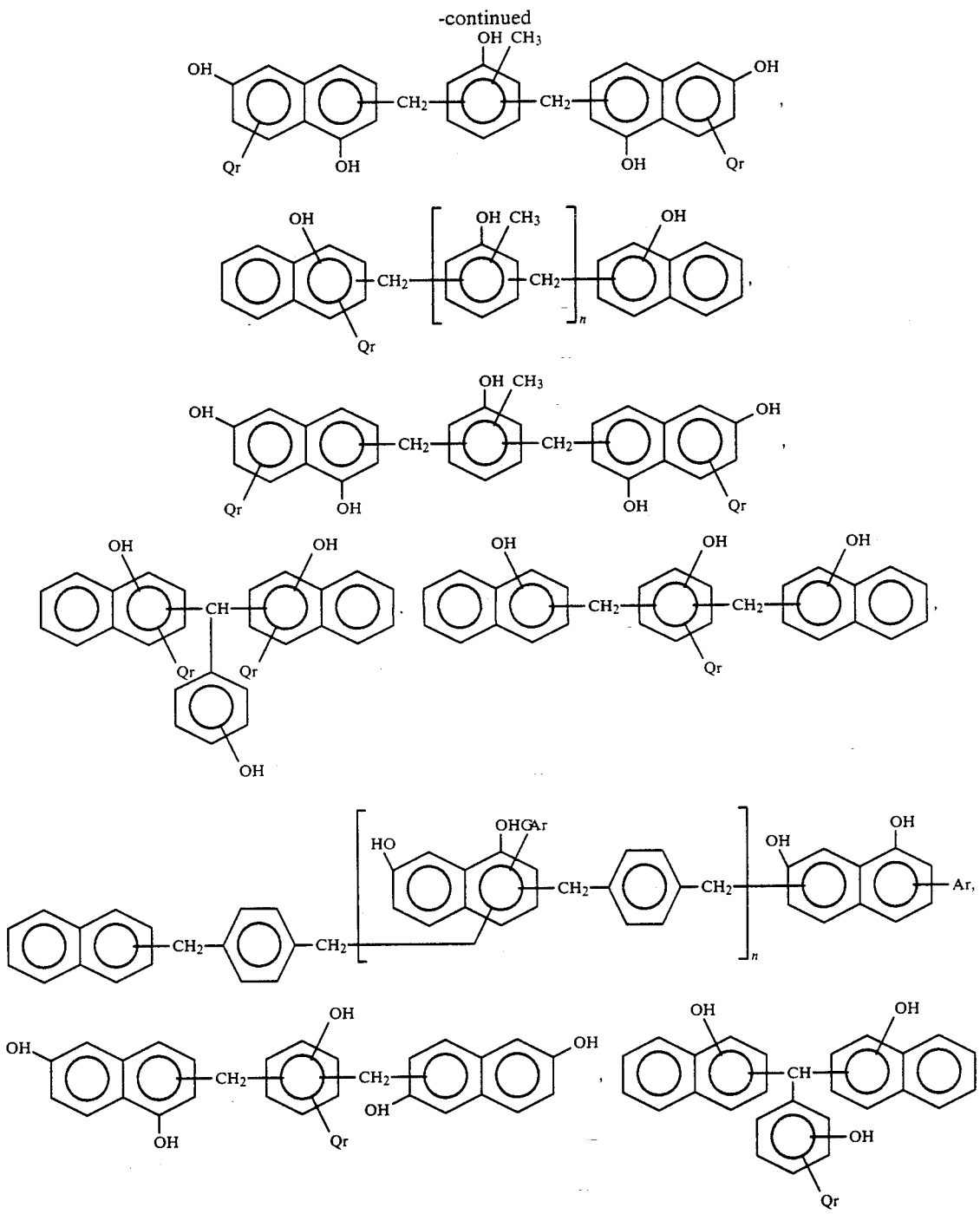

Qr: —CH=CH—CH₃ or —CH₂—CH=CH₂   Ar: —CH₂—CH=CH₂

The epoxy and phenolic resins each having an allyl group-containing naphthalene ring or epoxy and phenolic resins each having a naphthalene ring containing a double bond conjugated with an aromatic ring may be synthesized by conventional methods, for example, simply by reacting a phenolic resin with an allyl ether and subjecting the allyl etherified phenolic resin to Claisen rearrangement to form an allyl group-containing phenolic resin, and then subjecting it to rearrangement reaction in the presence of an alkali catalyst, obtaining a phenolic resin having a double bond (propenyl group) conjugated with an aromatic group. The phenolic resin may be converted into an end epoxy resin using epichlorohydrin.

In the composition of the invention, the total amount of components (B) and (C) blended preferably ranges from about 20 to about 400 parts, more preferably from about 50 to about 300 parts by weight per 100 parts by weight of component (A) or imide compound. Less than 20 parts of components (B) and (C) combined would sometimes result in cured products having poor workability and heat resistance whereas more than 400 parts of components (B) and (C) combined would lead to lower Tg and poor long-term heat resistance.

Desirably, components (B) and (C) contain epoxy and phenolic hydroxyl groups respectively in such quantities that the ratio of the quantity of epoxy group (a mol) to the quantity of phenolic hydroxyl group (b mol), a/b ranges from ½ to 3/2. Outside the range, curing property and low stress are sometimes lost.

The composition of the invention is a blend comprising components (A), (B), and (C) as defined above wherein at least one of components (B) and (C) includes a compound containing a naphthalene ring having an allyl group. Preferably, at least one of components (B) and (C) includes a compound containing a naphthalene ring having a double bond conjugated with an aromatic group in addition to the compound containing a naphthalene ring having an allyl group. When both a compound containing a naphthalene ring having an allyl group and a compound containing a naphthalene ring having a double bond conjugated with an aromatic group are included, they may be concurrently included in either one or both of components (B) and (C). Alternatively, one of components (B) and (C) may include one compound and the other of components (B) and (C) include the other compound. By using a resin containing a naphthalene ring having an allyl group in combination with a resin containing a naphthalene ring having a double bond conjugated with an aromatic group, there is obtained a composition having optimum curing rate and ease of molding.

In a preferred embodiment, a resin containing a naphthalene ring having an allyl group and a resin containing a naphthalene ring having a double bond conjugated with an aromatic group are blended such that b'/a' may range from 0.1 to 10, especially from 0.2 to 8, provided that a' is the moles of the allyl group on naphthalene ring and b' is the moles of the double bond conjugated with an aromatic group.

Preferably, the naphthalene ring-containing compound(s) are contained such that the naphthalene ring, which is either substituted or unsubstituted, may be present in an amount of at least 10% by weight based on components (B) and (C) combined. With a naphthalene ring content of less than 10% by weight, the resulting cured products would be less improved in crack resistance since the moisture absorption and the modulus of elasticity in a temperature range above Tg are insufficiently reduced. With a naphthalene ring content of more than 80% by weight, problems will arise with respect to dispersion upon preparation and moldability.

Further it is desired in the practice of the invention that the functional group ratio B'/A' range from 0.1 to 2, especially from 0.3 to 1, provided that component (A) or imide compound contains A' mol of a vinyl group and components (B) and (C) contain B' mol (in total) of a vinyl group in the compound containing a naphthalene ring having an allyl group plus the compound containing a naphthalene ring having a double bond conjugated with an aromatic ring. If functional group ratio B'/A' exceeds 2, that is, the vinyl group as the allyl group or conjugated double bond is present in a larger proportion, there would arise a curing problem that a larger portion is left unreacted, curing to less reliable products having poor long-term heat resistance. If B'/A' is less than 0.1, that is, the vinyl group as the allyl group or conjugated double bond is present in a smaller proportion, there would arise problems of moldability and mechanical strength.

For imparting low stress property to the composition of the invention, it is preferred to further blend (D) a copolymer obtained by reacting an aromatic polymer with a specific organopolysiloxane.

The aromatic polymer used herein may be selected from various compounds, for example, compounds having the following structural units.

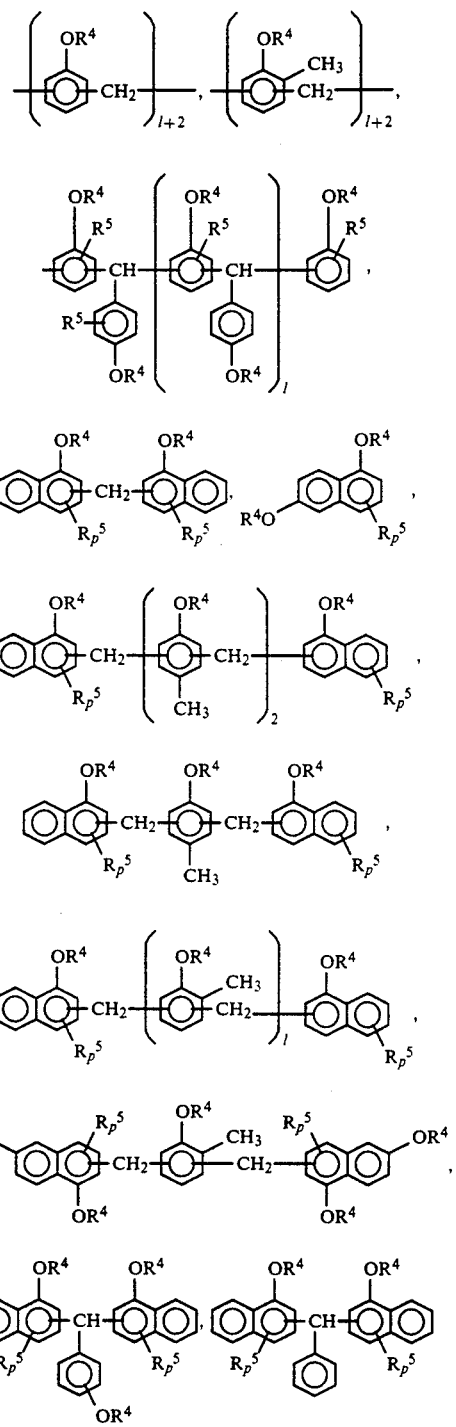

In the formulae, R⁴ is a hydrogen atom or

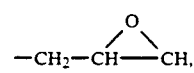

$R^5$ is independently selected from alkyl groups having 1 to 10 carbon atoms, l is an integer of from 0 to 4, and p is an integer of from 0 to 2.

Other useful aromatic polymers are naphthalene resins having an alkenyl group as shown by the following formulae.

In the formulae, n and m each are an integer of from 1 to 6.

The alkenyl group-containing naphthalene resins may be synthesized by conventional methods, for example, simply by reacting a naphthalene skeleton-containing phenolic resin with allyl glycidyl ether for introducing

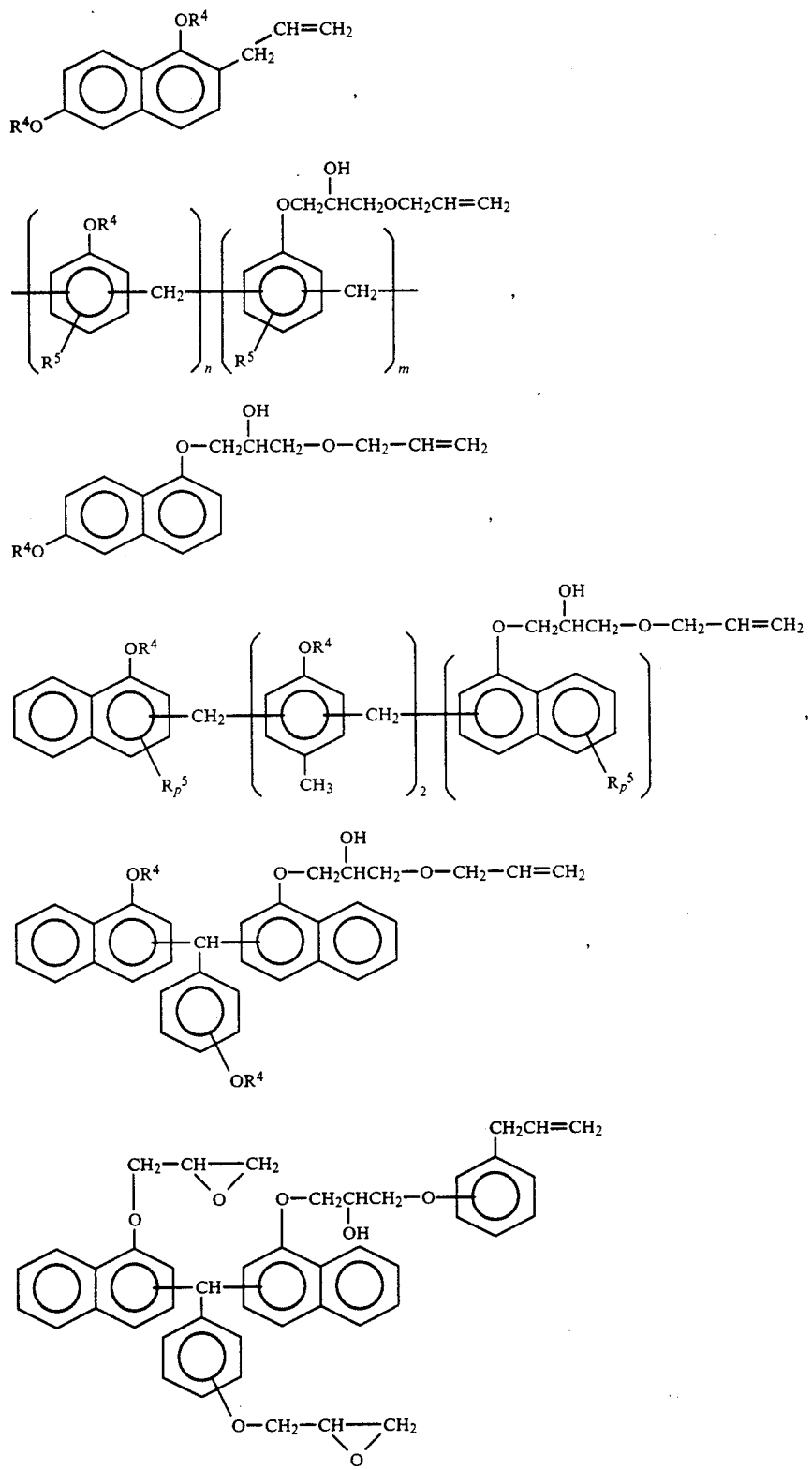

an alkenyl group into its molecule, or by partially reacting a naphthalene skeleton-containing epoxy resin with 2-allylphenol or the like.

The other reactant, organopolysiloxane has the compositional formula [II]:

$$R_a^1 R_b^2 SiO_{(4-a-b)/2} \quad [II]$$

wherein $R^1$ is a hydrogen atom, alkoxy group, or monovalent organic group containing a functional group selected from the group consisting of an amino, epoxy, hydroxyl and carboxyl group, $R^2$ is a substituted or unsubstituted monovalent hydrocarbon group, and letters a and b are positive numbers satisfying $0.001 \leq a \leq 1$, $1 \leq b \leq 3$, and $1 \leq a+b \leq 3$. The number of silicon atoms the organopolysiloxane has in its molecule is an integer of 2 to 1000. The number of $R^1$ groups directly attached to silicon atoms of the organopolysiloxane in its molecule is an integer of at least 1.

Examples of substituent $R^1$ include a hydrogen atom; an organic group containing a functional group selected from the group consisting of an amino group, an epoxy group, a hydroxyl group, and a carboxyl group such as $-C_xH_{2x}COOH$ wherein x is an integer of 0 to 10; and an alkoxy group such as methoxy, ethoxy, n-propoxy, butoxy, methoxyethoxy, and ethoxyethoxy groups. The substituent $R^2$ is a substituted or unsubstituted monovalent hydrocarbon group having 1 to 10 carbon atoms, for example, alkyl groups such as methyl, ethyl, n-propyl, and n-butyl groups; alkenyl groups such as vinyl and allyl groups; aryl groups such as phenyl and tolyl groups; aralkyl groups such as benzyl and phenylethyl groups; and substituted ones thereof in which some or all of the hydrogen atoms are replaced by halogen atoms, alkoxy-silyl groups or the like, such as chloromethyl, 3,3,3-trifluoropropyl, trimethoxysilylethyl and methyldimethoxysilylethyl groups.

Illustrative examples of the organopoly-siloxane of formula [II] are given below.

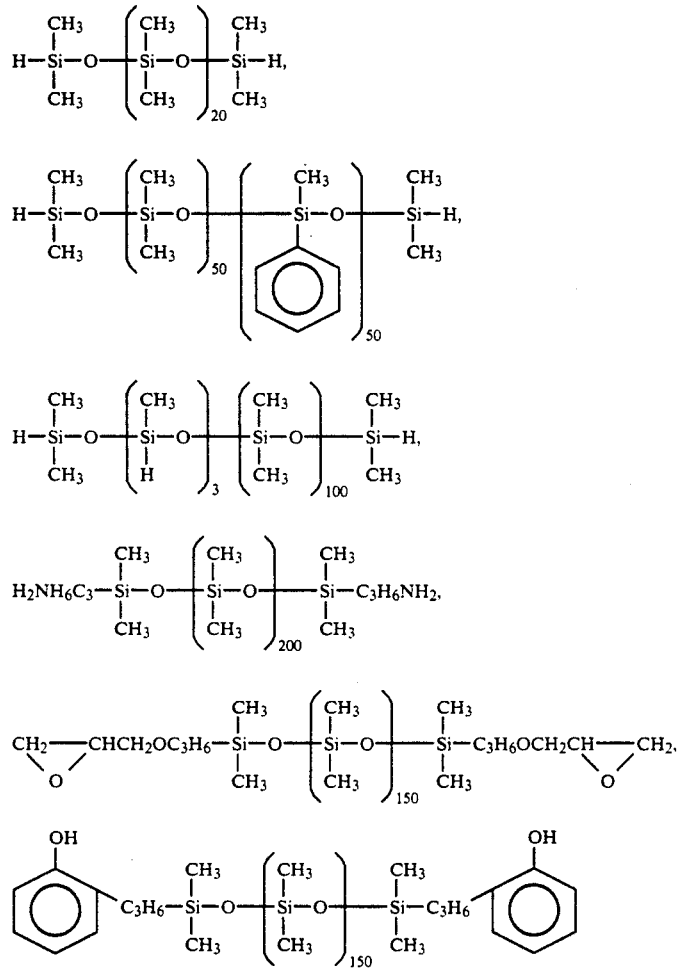

Although the molecular weight is not critical, the organopolysiloxane of formula [II] preferably has a molecular weight of about 100 to about 70,000. This molecular weight range is selected because when the aromatic polymer-organopolysiloxane copolymer is blended in the thermosetting resin composition, the copolymer is not miscible in the matrix, but forms a fine island-in-sea structure. With an organopolysiloxane molecular weight of less than 100, the resulting copolymer would not be effective for imparting flexibility or high Tg to the thermosetting resin composition when blended therein. With an organopolysiloxane molecular weight of more than 70,000, the resulting copolymer would become incompatible with the thermosetting resin composition, resulting in cured products having the copolymer separated and poor physical properties (flexural strength).

The copolymer between the aromatic polymer and the organopolysiloxane of formula [II] may be prepared by effecting addition reaction between them according to conventional methods. Addition reaction between the aromatic polymer and the organopolysiloxane of formula [II] is the best method for producing the desired copolymer. Such addition reaction is preferably effected in an inert solvent such as benzene, toluene, and methyl isobutyl ketone using a catalytic amount of any desired one of well-known addition catalysts, for example, platinum catalysts, typically chloroplatinic acid. The reaction temperature is not critical although a temperature of about 60° to 120° C. is preferred. Usually, reaction continues for about 30 minutes to about 24 hours. Copolymers between an aromatic polymer and an aminopolysiloxane or epoxypolysiloxane may be obtained by reacting the reactants at room temperature or elevated temperature. A suitable solvent such as methyl isobutyl ketone, toluene, dioxane and methyl cellosolve is desirably used in order to mix the reactants uniformly or nearly uniformly. For promoting the reaction, water, alcohols such as butanol, isopropyl alcohol and ethanol, and phenols may be used. It is also desirable to use reaction catalysts, for example, amines such as tributyl amine and 1,8-diazabicycloundecene-7, organic phosphines such as triphenylphosphine, and imidazoles such as 2-phenylimidazole.

In order to complete the crosslinkage between the imide compound having a maleimide group of formula [I] and the resin containing a naphthalene ring having an allyl group and the resin having a double bond conjugated with an aromatic group, a curing catalyst is preferably blended in the composition of the invention. Useful curing catalysts are organic peroxides including benzoyl peroxide, parachlorobenzoyl peroxide, 2,4-dichlorobenzoyl peroxide, capryl peroxide, lauroyl peroxide, acetyl peroxide, methyl ethyl ketone peroxide, cyclohexanone peroxide, bis(1-hydroxycyclohexyl peroxide), hydroxyheptyl peroxide, tert-butyl hydroperoxide, p-methane hydroperoxide, cumene hydroperoxide, di-tert-butyl peroxide, dicumyl peroxide, 2,5-dimethyl-2,5-di(tert-butyl peroxide)hexane, 2,5-dimethyl-hexyl-2,5-di(peroxybenzoate), tert-butyl perbenzoate, tert-butyl peracetate, tert-butyl peroctoate, tert-butyl peroxyisobutyrate, and di-tert-butyl diperphthalate alone and mixtures thereof.

Further, it is preferred to use various curing promoters for the purpose of promoting the reaction between the curing catalyst and the resins. Useful curing promoters include organic phosphines, for example, triphenyl phosphine, tricyclohexyl phosphine, tributyl phosphine, methyl diphenyl phosphine, 1,2-bis(diphenylphosphino)ethane, and bis(diphenylphosphino)methane; tertiary amines, for example, 1,8-diazabicyclo[5.4.0]undecene-7; and imidazoles. They may be used alone or in admixture of two or more insofar as the objects of the invention are not impaired.

The curing catalyst and curing promoter are used in a total amount of about 0.01 to 10 parts, especially about 0.1 to 2, parts by weight per 100 parts by weight of components (A), (B), (C) and (D) combined. A catalyst and promoter amount of less than 0.01 part would not be effective for curing promotion whereas more than 10 parts of the catalyst and promoter would cause the composition to cure too fast and adversely affect its moldability.

If desired, the composition of the invention may further contain an inorganic filler. The inorganic filler is selected from fillers commonly blended in thermosetting resin compositions, for example, silicas such as fused silica and crystalline silica, alumina, carbon black, mica, clay, kaolin, glass beads, glass fibers, aluminum nitride, silicon carbide, zinc oxide, antimony trioxide, calcium carbide, aluminum hydroxide, beryllium oxide, boron nitride, titaniumoxide, and ion oxide.

These inorganic fillers may be used alone or in admixture of two or more. The filler is preferably used in an amount of about 100 to about 1,000 parts, especially about 200 to about 700 parts by weight per 100 parts by weight of the total of components (A), (B), (C) and (D) although the filler content is not particularly limited.

The composition of the invention may further contain various well-known additives if desired. Exemplary additives include thermoplastic resins, thermoplastic elastomers, organic synthetic rubbers, silicone gel or cured silicone rubber powder; mold release agents such as waxes (e.g., carnauba wax) and fatty acids (e.g., stearic acid) and metal salts thereof; pigments such as carbon black, cobalt blue, and red iron oxide; flame retardants such as antimony oxide and halides; surface treating agents such as silanes (e.g., aminopropyltrimethoxysilane, methacryloxytrimethoxysilane, and γ-glycidoxypropyltrimethoxysilane); coupling agents such as epoxy silanes, vinyl silanes, boron compounds and alkyl titanates; anti-oxidants; other additives, and mixtures thereof.

The thermosetting resin composition of the invention may be prepared by mixing and agitating predetermined amounts of the necessary components uniformly, and milling the mixture in milling means preheated at 70° to 95° C., for example, a kneader, roll mill and extruder, followed by cooling and comminution. The order of mixing the components is not critical.

The compositions of the invention are advantageously applicable as molding materials, powder coating materials, and adhesives. The compositions are also useful in encapsulating various semiconductor devices including IC, LSI, transistors, thyristors and diodes and manufacturing printed circuit boards.

EXAMPLE

Examples of the present invention are given below together with comparative examples, by way of illustration and not by way of limitation. All parts are by weight.

Examples 1–15 and Comparative Examples 1–6

Twenty one (21) thermosetting resin compositions were prepared by uniformly melt mixing the following components in a hot two-roll mill. The components used were 30 parts of N,N'-4,4'-diphenylmethanebismaleimide, an epoxy resin and a phenolic resin both shown below and used in the amounts shown in Tables 1 to 3, triphenylphosphine and dicumyl peroxide curing catalysts in the amounts shown in Tables 1 to 3, 260 parts of quartz powder, 1.5 parts of γ-glycidoxypropyltrimethoxysilane, 1.5 parts of wax E, and 1.0 part of carbon black.

These compositions were examined by the following tests (A) to (F). The results are shown in Tables 1 to 3.

(A) Spiral flow

Using a mold according to the EMMI standard, measurement was made at 175° C. and 70 kg/cm$^2$.

(B) Flexural strength and Flexural modulus

Test bars of 10×4×100 mm which were molded at 180° C. and 70 kg/cm² for 2 minutes and post cured at 180° C. for 4 hours were tested at 215° C. according to JIS K6911.

(C) Coefficient of linear expansion (μ) and glass transition temperature (Tg)

Using a dilatometer, test pieces of 4 mm in diameter and 15 mm long were examined by heating the test pieces at a rate of 5° C./min.

(D) Crack resistance upon soldering after moisture absorption

Silicon chips of 2×6×0.3 mm were bonded to SO package frames of 4×12×1.8 mm and then encapsulated with the thermosetting resin compositions by molding at 175° C. for 2 minutes and post curing at 180° C. for 4 hours. The packages were allowed to stand in a hot humid atmosphere at 85° C. and RH 85% for 24 and 48 hours and then immersed for 10 seconds in a solder bath at 240° C. Then the packages were disintegrated to observe the occurrence of internal cracks. Reported is the number of cracked packages/the total number of packages tested.

(E) Moisture resistance

4-M DRAM chips were bonded to SOJ frames with 20 pins and then encapsulated with the thermosetting resin compositions by molding at 180° C. for 2 minutes and post curing at 180° C. for 4 hours. The packages were allowed to stand for 24 hours in a hot humid atmosphere at 121° C. and RH 100%, then dipped for 10 seconds in a solder bath at 260° C., and again allowed to stand for 300 hours in a hot humid atmosphere at 121° C. and RH 100%. Reported is the number of aluminum wire broken packages/the total number of packages tested.

(F) Water absorption

Disks of 50 mm in diameter and 3 mm thick were molded at 180° C. and 70 kg/cm² for 2 minutes and post cured at 180° C. for 4 hours. The disks were subjected to a pressure cooker test (PCT) at 121° C./100% RH for 24 hours before the water absorption (percent) was measured.

| Epoxy resin | | Epoxy equiv. | Softening point |
|---|---|---|---|
| (1) | [structure: naphthalene–CH₂–(CH₃-substituted phenyl with OG)–CH₂–naphthalene, with OG and Ar substituents] | 232 | 85° C. |
| (2) | [structure: naphthalene with Ar, OG, OG, Ar substituents] | 188 | 75° C. |
| (3) | [structure: naphthalene–CH₂–(phenyl with OG)–CH₂–naphthalene, with OG and Ar substituents] | 176 | 80° C. |
| (4) | [structure: repeating unit of (phenyl with OG, CH₃, CH₂, Ar)ₙ'] | 239 | 65° C. |
| (5) | Cresol novolak type epoxy resin EOCN-1020-65 (Nippon Kayaku K.K.) | 198 | 65° C. |
| (6) | Brominated epoxy resin BREN-S (Nippon Kayaku K.K.) | 280 | 80° C. |

-continued
(7) 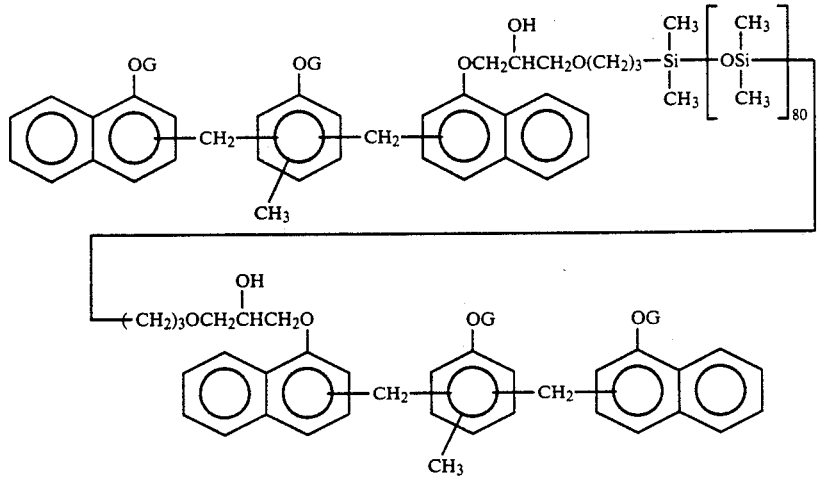 1800 95° C.
(8) 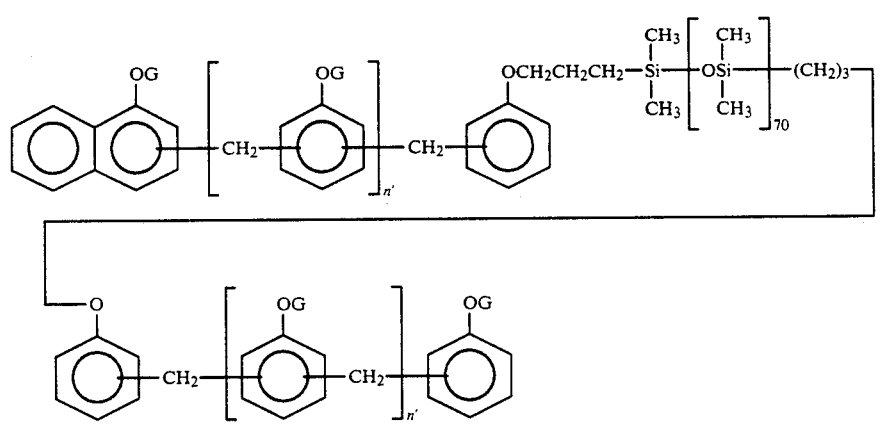 910 85° C.
(9) 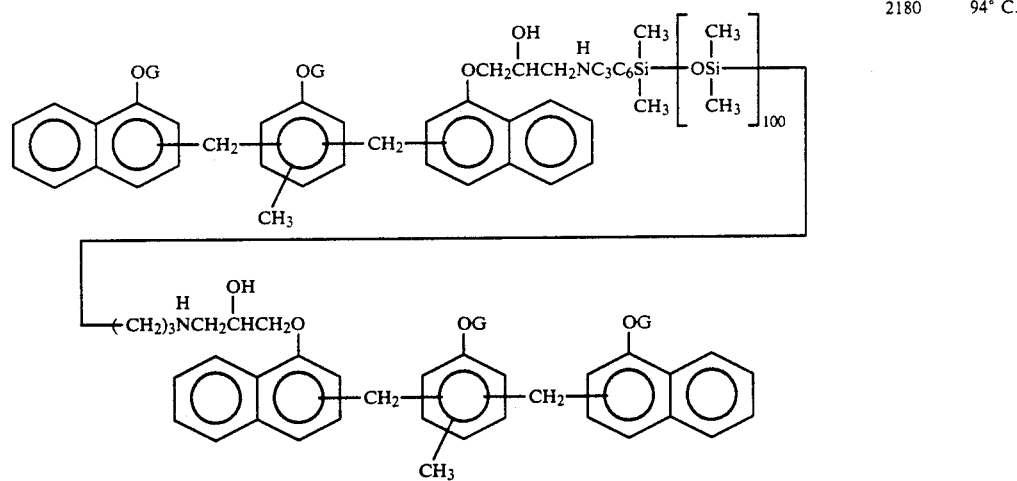 2180 94° C.
(10) 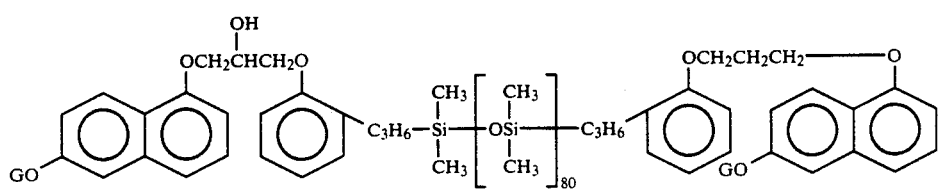 340 84° C.

-continued

G is —CH$_2$CH(—O—)CH$_2$, Ar is —CH$_2$—CH=CH$_2$, Pr is —CH=CH—CH$_3$, and n' is 2 to 7 on average.

| Phenolic resin | OH equiv. |
|---|---|
| (11) [structure: naphthol-CH$_2$-cresol-CH$_2$-naphthol with Ar substituents] | 169 |
| (12) [structure with repeat unit, n=2] | 149 |
| (13) [structure: dihydroxynaphthalene-CH$_2$-cresol-CH$_2$-dihydroxynaphthalene with Ar substituents] | 101 |
| (14) [tetra-substituted methane structure with naphthols and phenol] | 166 |
| (15) [poly(allylphenol) repeat unit] | 150 |
| (16) Phenol novolak resin KH3488 (Dai-Nihon Ink K.K.) Ar is —CH$_2$—CH=CH$_2$, 1 and n is 2 to 7. | 110 |

TABLE 1

| | Example | | | | | Comparative Example | | |
|---|---|---|---|---|---|---|---|---|
| | 1 | 2 | 3 | 4 | 5 | 1 | 2 | 3 |
| Composition (pbw) | | | | | | | | |
| N,N'-4,4'-diphenylmethanebismaleimide | 30 | 30 | 30 | 30 | 30 | 30 | 30 | — |
| Epoxy resin (1) | 12.3 | 42.5 | — | 35.6 | — | — | — | — |
| Epoxy resin (2) | — | — | 39.7 | — | — | — | — | — |
| Epoxy resin (3) | — | — | — | — | 38.7 | — | — | — |
| Epoxy resin (4) | 30.7 | — | — | — | — | 42.9 | 36.5 | 53.2 |
| Epoxy resin (6) | 6.0 | 6.0 | 6.0 | 6.0 | 6.0 | 6.0 | 6.0 | 6.0 |
| Phenolic resin (11) | — | — | — | 28.2 | — | — | — | 40.8 |
| Phenolic resin (15) | — | — | — | — | — | — | 27.5 | — |
| Phenolic resin (16) | 21.0 | 21.5 | 24.3 | — | 25.3 | 21.1 | — | — |
| Triphenyl phosphine | 1.0 | 1.0 | 1.0 | 1.0 | 1.0 | 1.0 | 1.0 | 1.0 |
| Dicumyl peroxide | 0.4 | 0.4 | 0.4 | 0.4 | 0.4 | 0.4 | 0.4 | — |
| Result | | | | | | | | |
| Spiral flow, inch | 48 | 47 | 49 | 48 | 50 | 34 | 31 | 32 |
| Flexural strength, kg/mm$^2$ | 3.0 | 3.1 | 2.9 | 3.1 | 3.2 | 1.7 | 2.0 | 2.1 |
| Flexural modulus, kg/mm$^2$ | 197 | 203 | 199 | 201 | 202 | 220 | 212 | 215 |
| Tg, °C. | 208 | 220 | 223 | 221 | 224 | 190 | 215 | 170 |
| $\mu$, 10$^{-5}$/°C. | 1.62 | 1.61 | 1.63 | 1.62 | 1.64 | 1.81 | 1.79 | 1.80 |

TABLE 1-continued

|  | Example |  |  |  |  | Comparative Example |  |  |
|---|---|---|---|---|---|---|---|---|
|  | 1 | 2 | 3 | 4 | 5 | 1 | 2 | 3 |
| Crack resistance | | | | | | | | |
| 85° C./85% RH 24 hr. | 0/20 | 0/20 | 0/20 | 0/20 | 0/20 | 20/20 | 20/20 | 12/20 |
| 85° C./85% RH 48 hr. | 0/20 | 0/20 | 0/20 | 0/20 | 0/20 | — | — | — |
| Moisture resistance | 0/40 | 0/40 | 0/40 | 0/40 | 0/40 | 40/40 | 40/40 | 30/40 |
| Water absorption, % | 0.52 | 0.52 | 0.51 | 0.48 | 0.53 | 0.71 | 0.70 | 0.55 |

TABLE 2

|  | Example |  |  |  |  |  |  |  |
|---|---|---|---|---|---|---|---|---|
|  | 6 | 7 | 8 | 9 | 10 | 11 | 12 | 13 |
| Composition (pbw) | | | | | | | | |
| N,N'-4,4'-diphenylmethanebismaleimide | 30 | 30 | 30 | 30 | 30 | 30 | 30 | 30 |
| Epoxy resin (1) | 35.3 | 27.9 | 29.1 | 35.0 | 35.3 | 35.4 | 31.1 | 36.3 |
| Epoxy resin (6) | 6.0 | 6.0 | 6.0 | 6.0 | 6.0 | 6.0 | 6.0 | 6.0 |
| Epoxy resin (7) | 10 | — | 10 | — | — | — | 10 | 10 |
| Epoxy resin (8) | — | 11 | — | 11 | — | — | — | — |
| Epoxy resin (9) | — | — | — | — | 10 | — | — | — |
| Epoxy resin (10) | — | — | — | — | — | 10 | — | — |
| Phenolic resin (11) | — | 25.1 | 24.9 | — | — | — | — | — |
| Phenolic resin (12) | — | — | — | — | — | — | 22.9 | — |
| Phenolic resin (13) | — | — | — | — | — | — | — | 17.7 |
| Phenolic resin (16) | 18.7 | — | — | 18.5 | 18.7 | 18.6 | — | — |
| Triphenyl phosphine | 1.0 | 1.0 | 1.0 | 1.0 | 1.0 | 1.0 | 1.0 | 1.0 |
| Dicumyl peroxide | 0.4 | 0.4 | 0.4 | 0.4 | 0.4 | 0.4 | 0.4 | 0.4 |
| Result | | | | | | | | |
| Spiral flow, inch | 46 | 45 | 47 | 44 | 45 | 46 | 41 | 47 |
| Flexural strength, kg/mm$^2$ | 3.2 | 3.3 | 3.0 | 3.2 | 3.1 | 3.0 | 3.2 | 3.0 |
| Flexural modulus, kg/mm$^2$ | 119 | 134 | 128 | 121 | 124 | 118 | 119 | 124 |
| Tg, °C. | 210 | 221 | 220 | 213 | 217 | 220 | 221 | 222 |
| μ, $10^{-5}$/°C. | 1.40 | 1.41 | 1.40 | 1.42 | 1.41 | 1.42 | 1.41 | 1.41 |
| Crack resistance | | | | | | | | |
| 85° C./85% RH 24 hr. | 0/20 | 0/20 | 0/20 | 0/20 | 0/20 | 0/20 | 0/20 | 0/20 |
| 85° C./85% RH 48 hr. | 0/20 | 0/20 | 0/20 | 0/20 | 0/20 | 0/20 | 0/20 | 0/20 |
| Moisture resistance | 0/40 | 0/40 | 0/40 | 0/40 | 0/40 | 0/40 | 0/40 | 0/40 |
| Water absorption, % | 0.57 | 0.53 | 0.51 | 0.55 | 0.57 | 0.54 | 0.52 | 0.53 |

TABLE 3

|  | Example |  | Comparative Example |  |  |
|---|---|---|---|---|---|
|  | 14 | 15 | 4 | 5 | 6 |
| Composition (pbw) | | | | | |
| N,N'-4,4'-diphenylmethane-bismaleimide | 30 | 30 | 30 | — | — |
| Epoxy resin (1) | 29.6 | 31.1 | — | — | — |
| Epoxy resin (3) | — | — | — | 50.2 | — |
| Epoxy resin (4) | — | — | 33.5 | — | 53.1 |
| Epoxy resin (6) | 6.0 | 6.0 | 6.0 | 6.0 | 6.0 |
| Epoxy resin (7) | 10.0 | 10.0 | 10.0 | 10.0 | 10.0 |
| Phenolic resin (14) | 24.4 | — | — | — | — |
| Phenolic resin (15) | — | 23.0 | — | 33.8 | — |
| Phenolic resin (16) | — | — | 20.5 | — | 30.9 |
| Triphenyl phosphine | 1.0 | 1.0 | 1.0 | 1.0 | 1.0 |
| Dicumyl peroxide | 0.4 | 0.4 | 0.4 | — | — |
| Result | | | | | |
| Spiral flow, inch | 46 | 45 | 29 | 40 | 29 |
| Flexural strength, kg/mm$^2$ | 3.4 | 3.3 | 1.7 | 1.6 | 1.5 |
| Flexural modulus, kg/mm$^2$ | 129 | 128 | 130 | 140 | 142 |
| Tg, °C. | 224 | 223 | 206 | 165 | 164 |
| μ, $10^{-5}$/°C. | 1.40 | 1.41 | 1.41 | 1.45 | 1.44 |
| Crack resistance | | | | | |
| 85° C./85% RH 24 hr. | 0/20 | 0/20 | 20/20 | 2/20 | 3/20 |
| 85° C./85% RH 48 hr. | 0/20 | 0/20 | — | 20/20 | 20/20 |
| Moisture resistance | 0/40 | 0/40 | 25/20 | 36/40 | 35/40 |
| Water absorption, % | 0.57 | 0.56 | 0.70 | 0.51 | 0.53 |

As seen from Tables 1 to 3, thermosetting resin compositions in which an imide compound having a maleimide group is blended with resins containing a naphthalene ring having an allyl group (Examples 1 to 15) are improved in Tg, flexural strength at high temperature, crack resistance, moisture resistance and water absorption over thermosetting resin compositions free of such a specific naphthalene ring-containing resin (Comparative Examples 1 to 6).

Examples 16–33 and Comparative Examples 7–9

Twenty one (21) thermosetting resin compositions were prepared by the same procedure as in Example 1 except that epoxy resins and phenolic resins shown below were used in the amounts shown in Tables 4 to 6.

These compositions were examined by the same tests, with the results shown in Tables 4 to 6.

| Epoxy resin | Epoxy equiv. | Softening point |
|---|---|---|

-continued

| | | | |
|---|---|---|---|
| (17) | [naphthalene-OG(Pr)]-CH₂-[phenyl-OG, CH₃]-CH₂-[naphthalene-OG(Pr)] | 232 | 85° C. |
| (18) | [naphthalene with Pr, Pr, OG, OG substituents] | 188 | 75° C. |
| (19) | [naphthalene-OG]-CH₂-[phenyl-OG(Pr)]-CH₂-[naphthalene-OG] | 176 | 80° C. |
| (20) | [naphthalene-OG(Ar)]-CH₂-[phenyl-OG, CH₃]-CH₂-[naphthalene-OG(Ar)] | 232 | 85° C. |
| (21) | [naphthalene with Pr, Ar, OG, OG substituents] | 188 | 75° C. |
| (22) | [−phenyl(OG, CH₃, Pr)−CH₂−]ₙ' | 239 | 65° C. |
| (23) | Cresol novolak type epoxy resin EOCN-1020-65 (Nippon Kayaku K.K.) | 198 | 65° C. |
| (24) | Brominated epoxy resin BREN-S (Nippon Kayaku K.K.) | 280 | 80° C. |
| (25) | [naphthalene-OG]-CH₂-[phenyl-OG, CH₃]-CH₂-[naphthalene-OCH₂CH(OH)CH₂O(CH₂)₃-Si(CH₃)₂-[OSi(CH₃)₂]₈₀-(CH₂)₃OCH₂CH(OH)CH₂O-naphthalene]-CH₂-[phenyl-OG, CH₃]-CH₂-[naphthalene-OG] | 1800 | 95° C. |

-continued
(26) 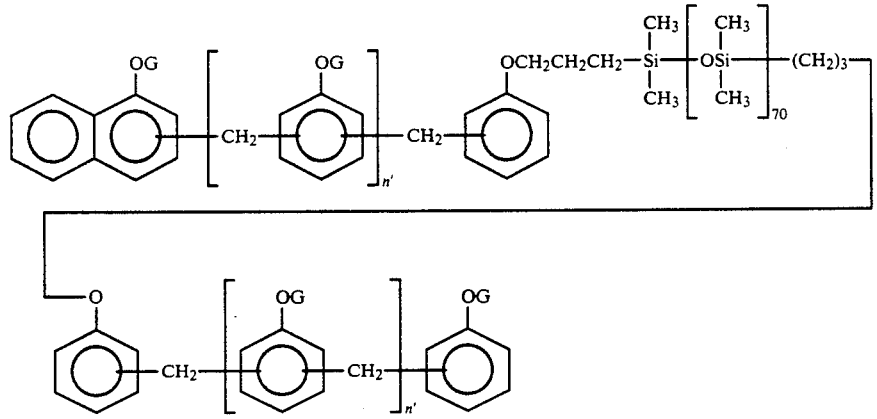 910 85° C.
(27) 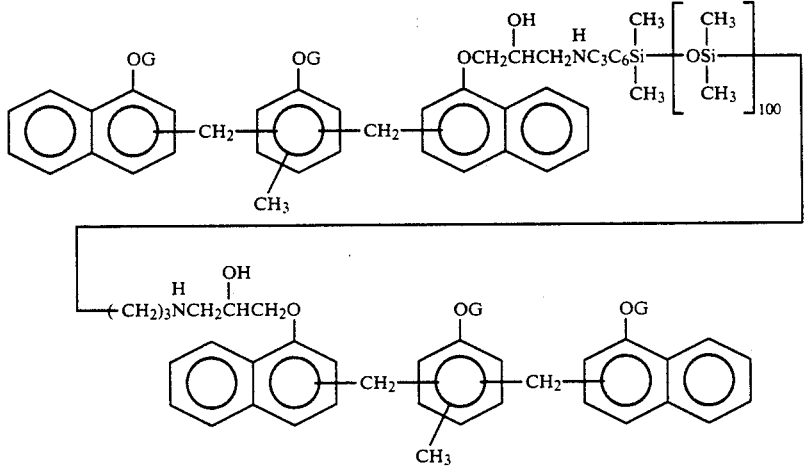 2180 94° C.
(28) 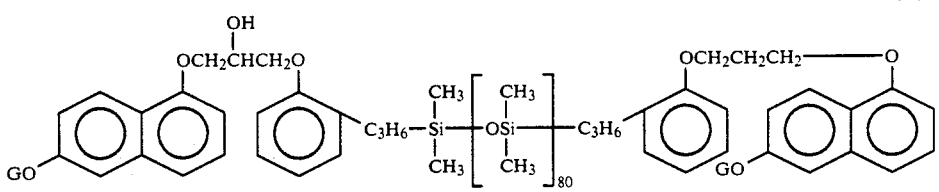 340 84° C.
G is —CH₂CH(—O—)CH₂, Ar is —CH₂—CH=CH₂, Pr is —CH=CH—CH₃, and n' is 2 to 7 on average.
| Phenolic resin | OH equiv. |
|---|---|
| (29) 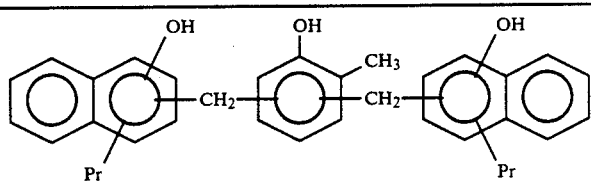 | 169 |
| (30) 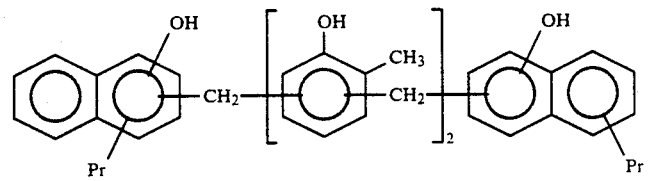 | 149 |

-continued

(31) 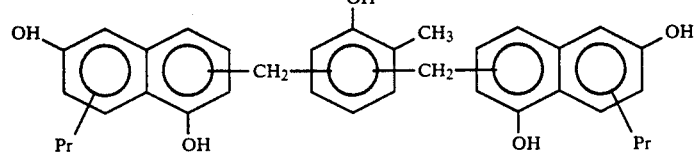 101

(32) 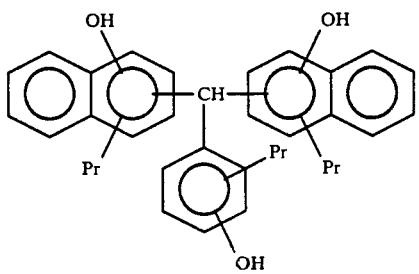 166

(33) 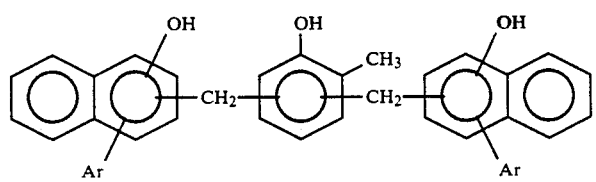 169

(34) 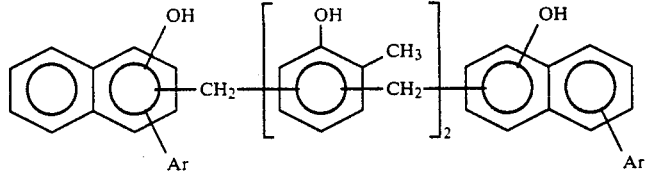 149

(35) 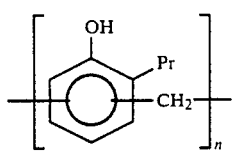 150

(36) Phenol novolak resin KH3488 (Dai-Nihon Ink K.K.)   110
Pr is —CH=CH—CH$_3$, Ar is —CH$_2$—CH=CH$_2$, and n is 2 to 7.

TABLE 4

| | Example | | | | | |
|---|---|---|---|---|---|---|
| | 16 | 17 | 18 | 19 | 20 | 21 |
| Composition (pbw) | | | | | | |
| N,N'-4,4'-diphenylmethanebismaleimide | 30 | 30 | 30 | 30 | 30 | 30 |
| Epoxy resin (17) | 6.2 | 21.3 | — | 17.8 | — | 20.5 |
| Epoxy resin (18) | — | — | 20.5 | — | — | — |
| Epoxy resin (19) | — | — | — | — | 20.3 | — |
| Epoxy resin (20) | 6.1 | 21.2 | 20.5 | 17.8 | 20.3 | — |
| Epoxy resin (21) | — | — | — | — | — | 20.5 |
| Epoxy resin (22) | 30.7 | — | — | — | — | — |
| Epoxy resin (23) | — | — | — | — | — | — |
| Epoxy resin (24) | 6.0 | 6.0 | 6.0 | 6.0 | 6.0 | 6.0 |
| Phenolic resin (29) | — | — | — | 28.2 | — | — |
| Phenolic resin (35) | — | — | — | — | — | — |
| Phenolic resin (36) | 21.0 | 21.5 | 23.0 | — | 23.5 | 23.0 |
| Triphenyl phosphine | 1.0 | 1.0 | 1.0 | 1.0 | 1.0 | 1.0 |
| Dicumyl peroxide | 0.4 | 0.4 | 0.4 | 0.4 | 0.4 | 0.4 |
| Result | | | | | | |
| Spiral flow, inch | 42 | 37 | 38 | 40 | 41 | 41 |
| Flexural strength, kg/mm$^2$ | 3.2 | 3.4 | 3.1 | 3.3 | 3.4 | 3.2 |
| Flexural modulus, kg/mm$^2$ | 198 | 205 | 201 | 202 | 204 | 200 |
| Tg, °C. | 208 | 220 | 223 | 221 | 224 | 190 |
| $\mu$, $10^{-5}$/°C. | 1.61 | 1.60 | 1.62 | 1.61 | 1.63 | 1.61 |
| Crack resistance | | | | | | |
| 85° C./85% RH 24 hr. | 0/20 | 0/20 | 0/20 | 0/20 | 0/20 | 0/20 |

TABLE 4-continued

| | Example | | | | | |
|---|---|---|---|---|---|---|
| | 16 | 17 | 18 | 19 | 20 | 21 |
| 85° C./85% RH 48 hr. | 0/20 | 0/20 | 0/20 | 0/20 | 0/20 | 0/20 |
| Moisture resistance | 0/40 | 0/40 | 0/40 | 0/40 | 0/40 | 0/40 |
| Water absorption, % | 0.52 | 0.51 | 0.53 | 0.50 | 0.52 | 0.51 |

TABLE 5

| | Example | | | | | | | |
|---|---|---|---|---|---|---|---|---|
| | 22 | 23 | 24 | 25 | 26 | 27 | 28 | 29 |
| Composition (pbw) | | | | | | | | |
| N,N'-4,4'-diphenylmethanebismaleimide | 30 | 30 | 30 | 30 | 30 | 30 | 30 | 30 |
| Epoxy resin (17) | 17.6 | 14.0 | 14.6 | 17.5 | 17.7 | 17.7 | 15.6 | 18.2 |
| Epoxy resin (20) | 17.7 | 13.9 | 14.5 | 17.5 | 17.6 | 17.7 | 15.5 | 18.1 |
| Epoxy resin (24) | 6.0 | 6.0 | 6.0 | 6.0 | 6.0 | 6.0 | 6.0 | 6.0 |
| Epoxy resin (25) | 10 | — | 10 | — | — | — | 10 | 10 |
| Epoxy resin (26) | — | 11 | — | 11 | — | — | — | — |
| Epoxy resin (27) | — | — | — | — | 10 | — | — | — |
| Epoxy resin (28) | — | — | — | — | — | 10 | — | — |
| Phenolic resin (29) | — | 25.1 | 24.9 | — | — | — | — | — |
| Phenolic resin (30) | — | — | — | — | — | — | 22.9 | — |
| Phenolic resin (31) | — | — | — | — | — | — | — | 17.7 |
| Phenolic resin (36) | 18.7 | — | — | 18.5 | 18.7 | 18.6 | — | — |
| Triphenyl phosphine | 1.0 | 1.0 | 1.0 | 1.0 | 1.0 | 1.0 | 1.0 | 1.0 |
| Dicumyl peroxide | 0.4 | 0.4 | 0.4 | 0.4 | 0.4 | 0.4 | 0.4 | 0.4 |
| Result | | | | | | | | |
| Spiral flow, inch | 31 | 30 | 32 | 31 | 30 | 31 | 29 | 32 |
| Flexural strength, kg/mm$^2$ | 3.2 | 3.4 | 3.1 | 3.3 | 3.2 | 3.0 | 3.1 | 3.0 |
| Flexural modulus, kg/mm$^2$ | 118 | 135 | 128 | 122 | 125 | 119 | 118 | 125 |
| Tg, °C. | 210 | 220 | 220 | 215 | 218 | 221 | 220 | 221 |
| $\mu$, $10^{-5}$/°C. | 1.40 | 1.40 | 1.42 | 1.41 | 1.41 | 1.42 | 1.40 | 1.42 |
| Crack resistance | | | | | | | | |
| 85° C./85% RH 24 hr. | 0/20 | 0/20 | 0/20 | 0/20 | 0/20 | 0/20 | 0/20 | 0/20 |
| 85° C./85% RH 48 hr. | 0/20 | 0/20 | 0/20 | 0/20 | 0/20 | 0/20 | 0/20 | 0/20 |
| Moisture resistance | 0/40 | 0/40 | 0/40 | 0/40 | 0/40 | 0/40 | 0/40 | 0/40 |
| Water absorption, % | 0.58 | 0.52 | 0.50 | 0.55 | 0.56 | 0.53 | 0.51 | 0.52 |

TABLE 6

| | Example | | | | Comparative Example | | |
|---|---|---|---|---|---|---|---|
| | 30 | 31 | 32 | 33 | 7 | 8 | 9 |
| Composition (pbw) | | | | | | | |
| N,N'-4,4'-diphenylmethanebismaleimide | 30 | 30 | 30 | 30 | 30 | — | — |
| Epoxy resin (17) | 28.8 | 31.1 | 29.4 | 31.2 | — | — | — |
| Epoxy resin (19) | — | — | — | — | — | 50.2 | — |
| Epoxy resin (20) | — | — | — | — | 33.5 | — | 53.1 |
| Epoxy resin (24) | 6.0 | 6.0 | 6.0 | 6.0 | 6.0 | 6.0 | 6.0 |
| Epoxy resin (25) | 10.0 | 10.0 | 10.0 | 10.0 | 10.0 | 10.0 | 10.0 |
| Phenolic resin (32) | 12.6 | — | — | — | — | — | — |
| Phenolic resin (33) | 12.6 | — | 24.6 | — | — | — | — |
| Phenolic resin (34) | — | 11.4 | — | 22.8 | — | — | — |
| Phenolic resin (35) | — | 11.5 | — | — | — | 33.8 | — |
| Phenolic resin (36) | — | — | — | — | 20.5 | — | 30.9 |
| Triphenyl phosphine | 1.0 | 1.0 | 1.0 | 1.0 | 1.0 | 1.0 | 1.0 |
| Dicumyl peroxide | 0.4 | 0.4 | 0.4 | 0.4 | 0.4 | — | — |
| Result | | | | | | | |
| Spiral flow, inch | 42 | 40 | 43 | 41 | 29 | 30 | 29 |
| Flexural strength, kg/mm$^2$ | 3.5 | 3.4 | 3.3 | 3.1 | 1.7 | 1.6 | 1.5 |
| Flexural modulus, kg/mm$^2$ | 130 | 128 | 129 | 131 | 130 | 140 | 142 |
| Tg, °C. | 225 | 223 | 221 | 224 | 206 | 165 | 164 |
| $\mu$, $10^{-5}$/°C. | 1.41 | 1.42 | 1.43 | 1.42 | 1.41 | 1.45 | 1.44 |
| Crack resistance | | | | | | | |
| 85° C./85% RH 24 hr. | 0/20 | 0/20 | 0/20 | 0/20 | 20/20 | 2/20 | 3/20 |
| 85° C./85% RH 48 hr. | 0/20 | 0/20 | 0/20 | 0/20 | — | 20/20 | 20/20 |
| Moisture resistance | 0/40 | 0/40 | 0/40 | 0/40 | 25/40 | 36/40 | 35/40 |
| Water absorption, % | 0.56 | 0.57 | 0.55 | 0.57 | 0.70 | 0.51 | 0.53 |

As seen from Tables 4 to 6, thermosetting resin compositions in which an imide compound having a maleimide group is blended with a resin containing a naphthalene ring having an allyl group and a resin containing a naphthalene ring having a double bond conjugated with an aromatic group and (Examples 16 to 33) are improved in Tg, flexural strength at high temperature, crack resistance, moisture resistance and water absorption over thermosetting resin compositions free of such a double bond or naphthalene ring-containing resin (Comparative Examples 7 to 9).

Although some preferred embodiments have been described, many modifications and variations may be made thereto in the light of the above teachings. It is therefore to be understood that within the scope of the appended claims, the invention may be practiced otherwise than as specifically described.

We claim:

1. A thermosetting resin composition comprising:
   (A) an imide compound having a maleimide group of the general formula (I):

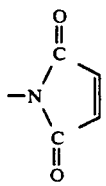

(B) a resin having at least two epoxy groups in a molecule, and
   (C) a resin having a phenolic hydroxyl group in a molecule,
   wherein at least one of the resins of components (B) and (C) further comprises a naphthalene ring substituted with an allyl group in the molecule of the resin.

2. The thermosetting resin composition according to claim 1, wherein at least one of the resins of components (B) and (C) comprises a naphthalene ring and a double bond conjugated with an aromatic group in the molecule of the resin.

3. The thermosetting resin composition according to claim 1, which further comprises
   (D) a copolymer obtained by reacting an aromatic polymer with an organopolysiloxane of the following compositional formula:

$$R_a^1 R_b^2 SiO_{(4-a-b)/2} \quad [II]$$

wherein $R^1$ is a hydrogen atom, an organic group containing one member selected from the group consisting of an amino, epoxy, hydroxyl and carboxyl group, or an alkoxy group,
   $R^2$ is a substituted or unsubstituted monovalent hydrocarbon group,
   letters a and b are positive numbers meeting $0.001 \leq a \leq 1$, $1 \leq b \leq 3$, and $1 \leq a+b \leq 3$, the number of silicon atoms in a molecule being an integer of from 2 to 1,000, and the number of $R^1$ groups attached to a silicon atom in a molecule being an integer of at least 1.

4. The thermosetting resin composition according to claim 1, wherein the imide compound is selected from the group consisting of N-substituted trimaleimides and N-substituted bismaleimides.

5. The thermosetting resin composition according to claim 1, wherein component (B) is an epoxy resin containing a naphthalene ring substituted with an allyl group or an epoxy resin containing a naphthalene ring and a double bond conjugated with an aromatic ring.

6. The thermosetting resin composition according to claim 1, wherein component (C) is a phenolic resin containing a naphthalene ring substituted with an allyl group or a phenolic resin containing a naphthalene ring and a double bond conjugated with an aromatic ring.

7. The thermosetting resin composition according to claim 1, wherein components (B) and (C) are presented in a total amount of about 20 to about 400 parts by weight per 100 parts by weight of component (A).

8. The thermosetting resin composition according to claim 1, wherein components (B) and (C) contain at least about 10% by weight of naphthalene ring based on their total weight.

9. The thermosetting resin composition according to claim 5, wherein said epoxy resin is selected from the group consisting of:

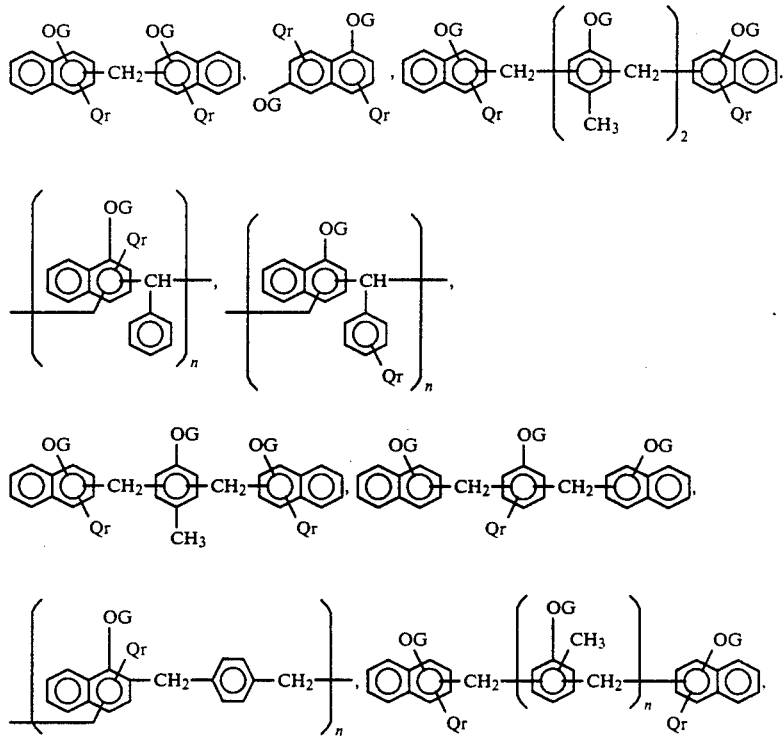

-continued
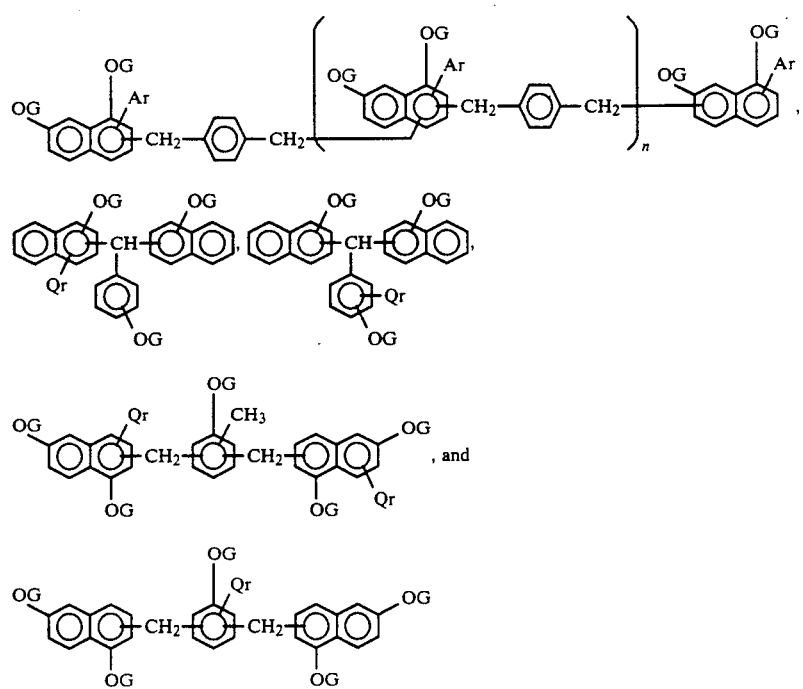
wherein
G is
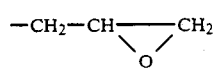
Qr is —CH=CH—CH$_3$ or —CH$_2$—CH=CH$_2$
Ar is —CH$_2$—CH=CH$_2$, and
n is an integer of from 2 to 7.
10. The thermosetting resin composition according to claim 6, wherein said phenolic resin is selected from the group consisting of:
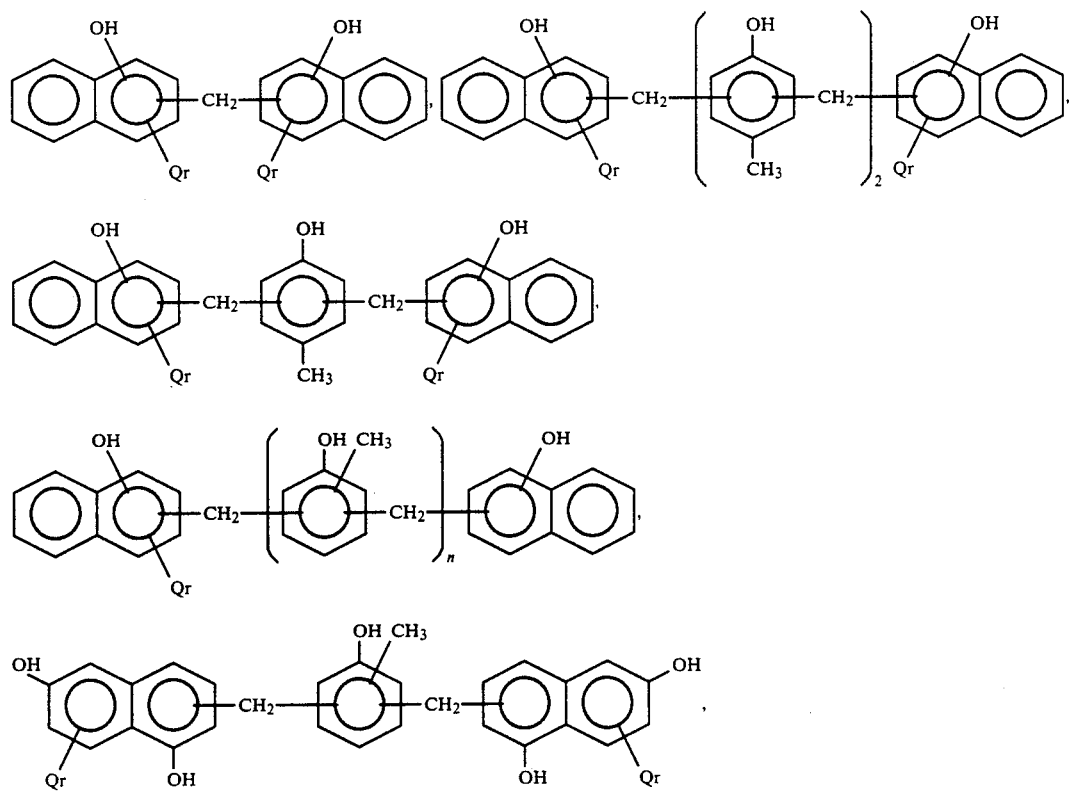

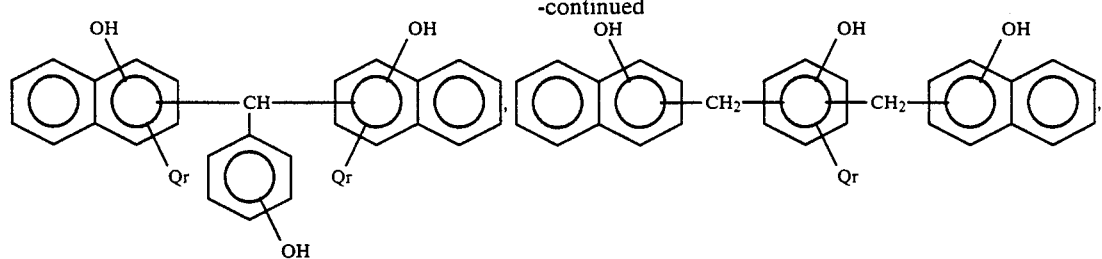
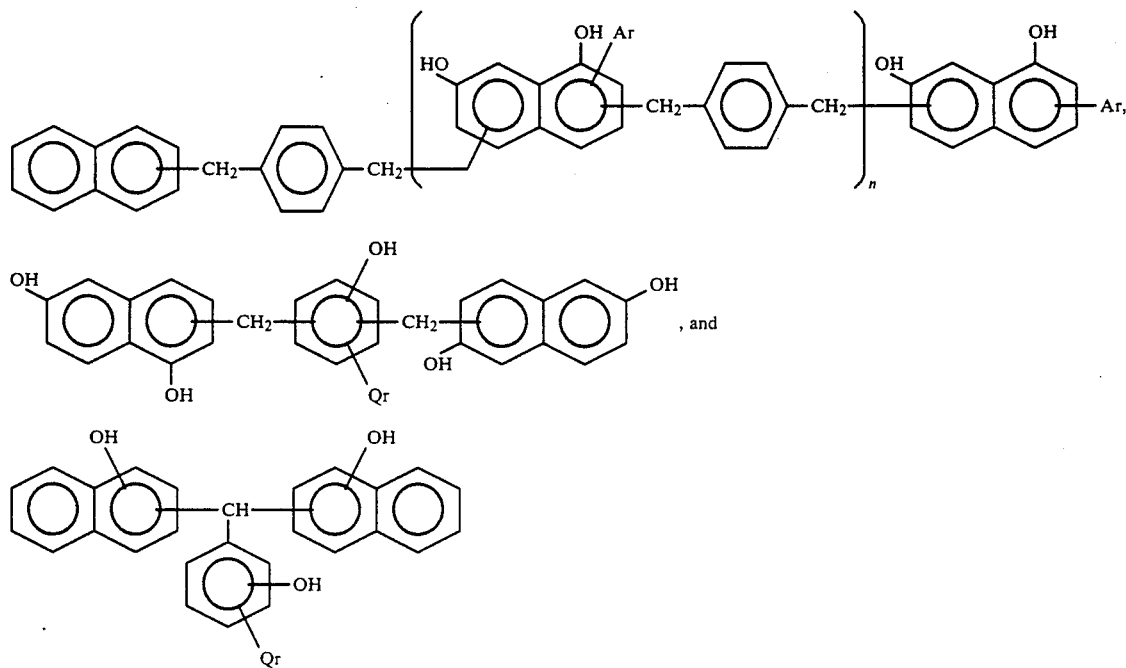
wherein
Qr is —CH=CH—CH₃ or —CH₂—CH=CH₂
Ar is —CH₂—CH=CH₂, and
n is an integer of from 2 to 7.
* * * * *